United States Patent Office 3,438,753
Patented Apr. 15, 1969

3,438,753
TUNGSTEN-COPPER COMPOSITES
James C. Kenney and J Richard Lawrence, Indianapolis, Ind., assignors to P. R. Mallory & Co., Inc., Indianapolis, Ind., a corporation of Delaware
No Drawing. Original application July 23, 1965, Ser. No. 474,448, now Patent No. 3,382,066. Divided and this application May 1, 1967, Ser. No. 649,388
Int. Cl. B22f 7/00
U.S. Cl. 29—182.1          7 Claims

ABSTRACT OF THE DISCLOSURE

A tungsten-copper composite wherein a body of tungsten and copper is formed by pressing and sintering co-reduced powders of tungsten and copper, the body being impregnated with additional copper.

---

This is a division of application Ser. No. 474,448, filed July 23, 1965, now Patent No. 3,382,066.

The present invention relates to high-density tungsten base alloys, and more particularly relates to tungsten base alloys having improved physical properties, and wherein three known processes are utilized in a previously unused combination to produce composites having superior properties to those of composites known in the art.

Copper-tungsten composites have been used for many years as welding electrodes and contacts for circuit breakers. More recently, these materials have been utilized for rocket nozzles and electrical discharging machining electrodes.

The aforementioned composites have been most commonly produced by compacting and sintering tungsten powder and infiltrating the resultant compact with copper powder.

Composites having a range of 40–80% tungsten and 60–20% copper were previously produced by a process wherein predetermined amounts of elemental tungsten or tungsten and copper were mixed with or without binders, and pressed to a predetermined density, heated in a protective atmosphere to sinter the tungsten particles then reheated in a protective atmosphere with additional elemental copper above the melting point of copper (1083° C.), causing the copper to melt and infiltrate the pores of the compact. However, the resulting composites have a number of disadvantages. It has been necessary to use relatively coarse copper powder on the order of 10 microns or greater, as fine copper powders oxidize excessively and require additional furnacing for high quality. This leads to a non-homogeneous structure featuring large copper-rich areas or lakes, tungsten-rich areas and porosity which results in poorer strength, electrical properties and general physical characteristics that are both attainable and desirable.

Therefore, it is an object of the present invention to improve tungsten base composites.

It is an object of the present invention to provide a novel method for the commercial production of high-density tungsten base composites.

It is an object of the present invention to provide a copper-tungsten composite having superior density, hardness, conductivity, tensile strength, cross-breaking rupture strength, yield strength, proportional limit, modules of elasticity and elongation characteristics than conventionally produced composites.

It is an object of the present invention to provide a copper-tungsten composite having greater uniformity of structure than conventionally produced composites.

It is an object of the present invention to utilize the three well-known processes of co-reduction, sintering and infiltration in a previously unused combination to produce composites having properties superior to those of any previously manufactured.

The present invention, in another of its aspects, relates to the novel features of the instrumentalities described herein for teaching the principal objects of the invention and to the principles embodied in these instrumentalities, whether or not these features and principles may be used in the said object and/or in the said field.

Other objects of the present invention and the nature thereof will become apparent from the following description considered in conjunction with the accompanying claims wherein the scope of the invention is determined from the dependent claims.

Generally speaking, the present invention utilizes a co-reduction process for preparing copper-tungsten mixes. This process consists of blending tungsten oxide and cuprous oxide powders in predetermined proportions and reducing the blended oxides in a hydrogen atmosphere in a suitable furnace at 750° C. to 1025° C. thereby obtaining a preselected average particle size. The resulting particle size of the copper-tungsten mix can be selectively determined by the temperature, flow rate of the reducing atmosphere and the reduction time. An organic binder and a lubricant are then added to the reduced powder mix if necessary. Compacting, sintering and infiltration are then achieved by previously described and well-known methods. Final copper-tungsten proportions are controlled not only by original mix percentages but by the compacting pressure and the controlled density produced thereby. The controlled density in turn controls the amount of additional copper obtained during infiltration.

To obtain a compact in the range of 20–60 weight percent of copper, co-reduced copper-tungsten powders containing from 1 to 25 weight percent of copper oxide ($Cu_2O$) and 75 to 99 weight percent of tungsten oxide ($W_5O_{11}$) are subjected to standard press-sinter-infiltrate techniques. The resulting composite structure has a number of advantageous features. A more intimate mixing of the co-reduced copper and tungsten yields a more uniform structure than can be obtained from blended elemental powders. Copper-rich areas are not totally eliminated, but are sufficiently reduced in size to be a negligible factor. Average tungsten particle size and particle size range are both reduced. The latter is a feature which would be impossible with conventional powder mixes because both reduced tungsten particle size and range leads to pressing problems. The composites show improved conductivity and hardness which yields superior welding electrodes. The improved conductivity, hardness, strength and uniformity of structure yield longer wearing, better performing electrical contacts. All of the above-mentioned advantages contribute to superior performance in rocket nozzles.

Table I illustrates average values of the compacts obtained by the method of the present invention for 56 weight percent of tungsten and 44 weight percent of copper composites prepared from 90 weight percent of tungsten and 10 weight percent of copper co-reduced mix as compared to the values for 56 weight percent tungsten-44 weight percent copper composites prepared from a conventional powder mix. Table II is a comparison of the average values of 68 weight percent tungsten-32 weight percent copper compacts produced from a 90 weight percent tungsten-10 weight percent copper co-reduced powder mix and 68 weight percent tungsten-32 weight percent copper produced from a 90 weight percent tungsten-10 weight percent copper conventional mix.

TABLE I

| Property | 56%–44% Cu (Co-reduced) | 56%–44% Cu (Conventional) |
|---|---|---|
| Density (gms./cc.) | 12.580 | 12.558 |
| Hardness, Rockwell B | 78.8 | 73.3 |
| Conductivity, percent I.A.C.S. | 60.5 | 60.2 |
| Tensile strength (p.s.i.) | 68,200 | 63,000 |
| Yield strength (0.2% offset) (p.s.i.) | 146,250 | 120,000 |
| Elongation, percent | 10.0 | 4.8 |

TABLE II

| Property | 68%–32% Cu (Co-reduced) | 68%–32% Cu (Conventional) |
|---|---|---|
| Density (gms./cc.) | 13.890 | 13.640 |
| Hardness, Rockwell B | 90.9 | 83.2 |
| Conductivity, percent I.A.C.S. | 51 | 45 |
| Tensile strength (p.s.i.) | 141,000 | 80,000 |
| Yield strength (0.2% offset) (p.s.i.) | 176,250 | 130,000 |
| Elongation, percent | 3.4 | 2.6 |

While the density and conductivity of tungsten-composites produced by the present invention is only slightly greater than that of compacts produced from conventional powder mixes, the hardness, tensile strength, yield strength and elongation are considerably greater. As one of the objects of obtaining a tungsten-copper composite is to obtain a very hard material which will wear when exposed to high temperatures and stresses, or repeated electrical contact, the compacts produced from co-reduced powder mixes are far superior to compacts produced from conventional powder mixes.

In order to more fully understand the present invention, the following example illustrates the fabrication process for a typical tungsten-copper composite produced by the present invention.

EXAMPLE

To prepare a 95 weight percent tungsten-5 weight percent copper powder mix, 95.5 weight percent of blue tungsten oxide and 4.5 weight percent of cuprous oxide were blended for 2–6 hours to insure complete uniformity. The blended oxides were reduced in 400 gm. charges at a stoking speed of 15 minutes per boat at 950° C. to 1025° C. The powder was then pulverized and screened through a 150 mesh screen and blended into large lots to obtain a Scott apparent density of 40–50 g./in.$^3$. Compacting, sintering and infiltration are then achieved by previously described and well-known methods.

Although the present invention has been disclosed in connection with the preferred embodiments thereof, variations and modifications may be resorted to by those skilled in the art without departing from the scope of the invention. We consider all of these variations and modifications to be within the true spirit and scope of the present invention, as disclosed in the foregoing specification and defined by the appended claims.

We claim:
1. A tungsten-copper composite consisting essentially of a body of pressed and sintered, blended, co-reduced powders of tungsten and copper, with additional copper impregnated into said body.
2. A tungsten-copper composite according to claim 1, wherein said tungsten is in an amount of from 40–80% by weight of said composite, the balance being essentially copper.
3. A tungsten-copper composite according to claim 1, wherein tungsten is in an amount of about 56% by weight of said composite, the balance being essentially copper.
4. A tungsten-copper composite according to claim 1, wherein said tungsten is in an amount of about 68% by weight of said composite, the balance being essentially copper.
5. A tungsten-copper composite according to claim 1, wherein said composite has a theoretical density of at least 98%.
6. A tungsten-copper composite according to claim 3, wherein said composite has a theoretical density of about 98.5%.
7. A tungsten-copper composite according to claim 4, wherein said composite has a theoretical density of about 98.7%.

References Cited

UNITED STATES PATENTS

| | | | |
|---|---|---|---|
| 1,751,780 | 3/1930 | Weiger | 24—182.1 X |
| 2,179,960 | 11/1939 | Schwarzkopf | 75—208 X |
| 2,669,008 | 2/1954 | Lavi | 24—182.1 X |
| 2,983,996 | 5/1961 | Neely | 29—182 |
| 3,125,441 | 3/1964 | Lafferty | 29—182.1 X |
| 3,145,529 | 3/1964 | Maloof | 29—182.1 X |
| 3,338,687 | 8/1967 | Dickinson | 29—182.1 |

BENJAMIN R. PADGETT, *Primary Examiner.*

A. J. STEINER, *Assistant Examiner.*

U.S. Cl. X.R.

29—182.2; 75—208